United States Patent Office 3,560,373
Patented Feb. 2, 1971

3,560,373
SEPARATION OF PARAFFINS AND CHLOROPARAFFINS
Thomas A. Washall, Wilmington, Del., and Frank W. Melpolder, Wallingford, and Leonard N. Leum, Media, Pa., assignors to Atlantic Richfield Company, Philadelphia, Pa., a corporation of Pennsylvania
No Drawing. Filed Sept. 16, 1968, Ser. No. 762,360
Int. Cl. C07c 9/14; C10g 25/00
U.S. Cl. 208—262    6 Claims

ABSTRACT OF THE DISCLOSURE

Separation of straight chain paraffins, monochloroparaffins and polychloroparaffins by a cyclic silica gel adsorption process.

BACKGROUND OF THE INVENTION

Field of the invention

This invention relates to a cyclic, continuous method for the separation of straight chain paraffins and straight chain chloroparaffins including the separation of monochloroparaffins from polychloroparaffins and in particular the separation of such mixtures produced by the chlorination of long chain paraffins wherein silica gel is employed as a selective adsorbent.

Prior art

Processes for the separation of paraffins from aromatics utilizing the difference in the relative adsorbabilities of the paraffins and aromatics on silica gel adsorbents have long been known. Such processes have been found commercially feasible since there is a relatively large difference in the adsorbabilities of the paraffins and aromatics. In such processes the charge paraffins are recovered from the silica gel with a saturated solvent while the aromatics are recovered by desorption with an aromatic solvent of similar adsorption characteristics but different boiling point than the charge aromatics.

In an important method for the preparation of alkyl aryl sulfonate detergents a paraffin hydrocarbon fraction, particularly a straight chain $C_{10}$ to $C_{13}$ or $C_{14}$ or a $C_{11}$ to $C_{14}$ paraffin fraction, is chlorinated under conditions to give unreacted paraffins, monochloroparaffins and small amounts of polychloroparaffins. In order to minimize polychloroparaffin production conversion is generally limited to from about 10 to 20 percent. Under these conditions the chlorinated product will consist of approximately 90 percent monochloroparaffins and 10 percent polychloroparaffins. This fraction is utilized to alkylate benzene and subsequently the paraffins are recycled to the chlorination step. It would, of course, be desirable to provide an economic means for separating the paraffins, and monochloroparaffins from the polychloroparaffins in order to utilize only the monochloroparaffins for alkylation. It is unnecessary in this particular application to remove the paraffins from the monochloroparaffins since after alkylation the paraffins can be separated by distillation and recycled. Such a separation process would, however, permit the use of higher conversions per pass since the undesired polychloroparaffins could be separated and only the monochloroparaffins or mixture of paraffins and monochloroparaffins be used for alkylation. Such a process would provide many obvious economies as well as improved alkylbenzene for detergent manufacture.

The present invention provides such an economic method for the separation of these components of the paraffin chlorination reaction mixture.

Although the difference in relative adsorbabilities of paraffins and monochloroparaffins on silica gel is considerably smaller than the difference in the relative adsorbabilities of paraffins and aromatics the present invention differs from the prior art in that a method now has been found for utilizing the relatively small differences in the relative adsorbabilities of paraffins and monochloroparaffins to separate them from each other and also to utilize the difference between the relative adsorbabilities of both paraffins and monochloroparaffins from polychloroparaffins to separate them from polychloroparaffins and also from any aromatics which may be contained in the charge mixture. In addition this method can be carried out in a cyclic continuous manner without thermal regeneration of the silica gel bed.

SUMMARY OF THE INVENTION

In accordance with this invention straight chain paraffins, straight chain monochloroparaffins and straight chain polychloroparaffins are separated from each other by utilizing the differences in their adsorbabilities on silica gel. The paraffins and monochloroparaffins in the charge are separated and recovered from the silica gel bed by the use of a single saturated hydrocarbon solvent or desorbent. The polychloroparaffins and aromatics, if there are any aromatics in the charge, are recovered by desorbing the silica gel with an olefin or aromatic hydrocarbon. The paraffins and monochloroparaffins as well as the polychloroparaffin are recovered by distilling the solvent from each of them respectively. The silica gel bed is then washed with the saturated hydrocarbon solvent and left wet for the next cycle.

It is an object of this invention therefore to provide a method for the separation and recovery of paraffins, monochloroparaffins and polychloroparaffins from mixtures thereof.

It is another object of this invention to provide a method for the separation and recovery of paraffins, monochloroparaffins and polychloroparaffins by the use of a silica gel adsorbent.

It is another object of this invention to provide a method for the separation of paraffins, monochloroparaffins and polychloroparaffins from mixtures obtained by the chlorination of paraffin fractions.

It is another object of this invention to provide a method for continuous separation of products from the chlorination of n-paraffins without thermal regeneration of the silica gel adsorbent.

It is another object of this invention to provide an effective desorbent for recovering di- and polychloroparaffins from the silica gel in a manner that permits regeneration of the silica gel bed by subsequent washing with a solvent of lower polarity than the desorbent.

Other objects of this invention will be apparent from the following description of the preferred embodiments and from the claims.

DESCRIPTION OF THE PREFERRED EMBODIMENTS

The mixtures which are separable by the process of the instant invention are preferably straight chain paraffins in the $C_8$ to $C_{18}$ range and straight chain chloroparaffins in the same carbon number range. The process is applicable to the separation of paraffins from monochloroparaffins; monochloroparaffins from polychloroparaffins; paraffins from polychloroparaffins; and to the separation of mixtures of paraffins, monochloroparaffins and polychloroparaffins.

In a particularly preferred embodiment the invention is applied to the chlorination reaction mixture resulting from the chlorination of straight chain paraffins in the $C_{10}$ to $C_{14}$ range, wherein the monochloroparaffins are desired for use in alkylating benzene to produce linear alkylbenzenes which, in turn, are converted to biodegradable detergents by sufonation and neutralization.

The silica gel employed is the ordinary commercial material manufactured for adsorption purposes.

In carrying out the separation, the charge stock containing the mixture of straight chain paraffins and straight chain chloroparaffins is charged to a silica gel bed which has been pre-wet with a saturated hydrocarbon solvent wherein the hydrocarbon contains from 5 to 8 carbon atoms, n-pentane is particularly preferred. Other suitable solvents include hexane, heptane, octane, cyclohexane and the like.

After the charge has entered the gel bed, additional amounts of the same saturated hydrocarbon is added to push or wash the charge through the adsorbent. During the passage through the adsorbent bed the charge paraffins migrate ahead of the chloroparaffins since they are less strongly adsorbed. The quantity of charge to the silica gel bed is preferably not in excess of about 100 grams per 100 grams of the gel and amounts ranging between 20 and 80 are the most preferable. The quantity of saturated hydrocarbon used for washing is not critical, however, it is preferred to wash with about 3 to 4 milliliters of hydrocarbon per gram of gel. In general, the amount should be sufficient to completely wash the charge through the gel bed and thus amounts in excess of those mentioned may be used. At low charge loadings of rates (~20 to 40 grams of charge per 100 grams of silica gel) the pure saturated hydrocarbon solvent issues first followed by: (1) a mixture of solvent and charge paraffins, (2) pure solvent, and (3) a mixture of solvent and charge monochloroparaffins.

The polychloroparaffins and any aromatics which may be contained in the charge are recovered by desorbing the silica gel with penten-1 or similar olefin having from 5 to 8 carbon atoms or with benzene, toluene or similar aromatic with pentene-1 being the preferred solvent. In regeneration of the silica gel adsorbent it is also preferable to use 3 or 4 volumes of saturated hydrocarbon per gram of gel to wash the bed before the next cycle. The paraffins and monochloroparaffins are recovered by flash vaporization or distillation of the saturated hydrocarbon solvent therefrom. Similarly, the polychloroparaffins and aromatics are recovered by stripping the olefin or aromatic solvent by flash vaporization or distillation.

In practice the frequency of the desorption step is governed by the composition of the charge. In charge stocks where the total polychloroparaffin and aromatic content is very low several cycles may be completed before desorption is necessary to recover the polychloroparaffins and aromatics. At high charge loadings or rates (~40 to 80 grams of charge per 100 grams of silica gel), the composition of the effluent is similar to that of low charge rates except that after the mixture of saturated hydrocarbon solvent and charge paraffin emerge, a mixture of saturated hydrocarbon solvent, charge paraffin and monochloroparaffin is collected in place of pure saturated hydrocarbon solvent. Thereafter the monochloroparaffin in saturated hydrocarbon solvent emerges. The mixture of paraffin and monochloroparaffin can be recycled after solvent stripping. The size of the recycle fraction is dependent upon the ratio of charge to adsorbent and upon the composition of the charge.

For charge stocks with little or no polychloroparaffin and aromatic content the cycle is completed upon recovery of the monochloroparaffins by the n-pentane washing. Fresh charge stock and the recycle paraffin-monochloroparaffin fraction is charged to the bed and the cycle repeated. When charge stocks contain appreciable quantities of polychloroparaffins or aromatics or a mixture of both, a slightly modified cycle is required.

Polychloroparaffins and aromatics being more strongly adsorbed than paraffins and monochloroparaffins become concentrated on the silica gel. Eventually an equilibrium concentration is reached and a mixture of polychloroparaffins and aromatics are washed from the gel bed and appear as impurities in the monochloroparaffin fraction. Consequently, it is necessary to periodically desorb the gel bed with an olefin such as pentene-1 or with an aromatic such as benzene with pentene-1 being the preferred solvent.

Following the desorption the bed is washed with excess n-pentane or similar $C_5$ to $C_8$ saturated hydrocarbon solvent, which treatment fully restores the adsorptive capacity of the silica gel for the desired separations.

In commercial operation wherein straight chain paraffins are chlorinated in accordance with well known thermal chlorination processes to provide the mixture of paraffins, monochloroparaffins and polychloroparaffins, it is generally preferred to pretreat the charge stock with a shallow bed of either alumina or alumina plus silica gel to remove moisture and trace quantities of highly polar impurities. The chlorination mixture is thereafter suitable for treatment in accordance with the process of this invention which has been described.

In general, the separation is carried out at room temperatures and pressures although higher temperatures and superatmospheric pressures may be used if molecular weight fractions in the upper end of the range are being separated since these have higher viscosities and therefore will percolate more slowly. The higher temperature or pressure or both will speed their percolation.

The following examples are provided for the purpose of illustrating the invention in greater detail but they should not be construed as limiting.

EXAMPLE I

In order to make a quantitative study of the method of this invention a separation was carried out using a mixture of 10.7 weight percent 1-chlorododecane and 89.3 weight percent n-dodecane. A 12 inch by 1 inch diameter column was packed with 100 grams of commercial adsorbent silica gel, 28–200 mesh. The silica gel was pre-wet with n-pentane and thereafter 80 grams of the test mixture was charged followed by 350 ml. of n-pentane. The percolation rate was 2 ml. per minute. The column effluent was monitored by gas chromatographic analysis and the paraffin, intermediate and chloroparaffin fractions were collected respectively.

After solvent removal the paraffin and chloroparaffin fractions were analyzed. The results of this first run are shown on Table I.

An identical second run was made through the same silica gel bed and the results are shown under run No. 2 on Table I.

TABLE I

|  | Run Number 1 | | | Run Number 2 | | |
|---|---|---|---|---|---|---|
|  | Yield, (weight percent) | Weight, percent component | | Yield, (weight percent) | Weight, percent component | |
|  |  | Paraffin | Chloroparaffin |  | Paraffin | Chloroparaffin |
| Paraffin fraction | 92.1 | 100.0 | 0 | 88.1 | 100.0 | 0 |
| Intermediate fraction | 0.5 |  |  | 5.7 |  |  |
| Chloroparaffin fraction | 7.4 | 2.3 | 97.7 | 6.2 | 1.6 | 98.4 |
| Total | 100.0 |  |  | 100.0 |  |  |

These results demonstrate that extremely efficient separations can be accomplished by the method of this invention.

EXAMPLE II

The procedure described in Example I was applied to a mixture containing $C_{10}$ to $C_{13}$ straight chain paraffins and straight chain monochloroparaffins. This mixture resulted from a commercial chlorination plant wherein straight chain $C_{10}$–$C_{13}$ paraffins were chlorinated, the chlorinated product was utilized to alkylate benzene and after alkylation the unreacted paraffins together with small amounts of aromatics (mainly alkyl aromatics not separated by the distillation step) were recycled to the chlorination step. The analysis showed the paraffin content to be 83.6 weight percent; monochloroparaffin content, 12.2 weight percent; polychloroparaffin content, 1.5 weight percent; and aromatics 2.7 weight percent.

Three runs were made utilizing various loadings. The results of these runs are shown in Table II.

EXAMPLE III

Runs were carried out to show the effect of making multiple runs through the same gel bed without benzene or pentene-1 desorption after each run. Using the same charge stock and procedure employed in the Examples I and II and a loading of 40 grams per 100 grams of silica gel, a single run was made and the bed was desorbed with 200 ml. of benzene. After washing the silica gel with 400 ml. of n-pentene, 40 grams of charge were passed through the bed followed by 350 ml. of n-pentene to recover the paraffins and monochloroparaffins. This cycle was repeated 7 times for a total of 8 cycles. The results of these 8 cycles are shown in Table III.

In the ninth cycle the bed was desorbed with 200 ml. of benzene as in the first cycle giving the results shown. The bed was regenerated by washing with 400 ml. of n-pentane. The results shown after the tenth cycle which included the benzene desorption are also set forth in Table III.

TABLE III

| | Monochloroparaffin fraction | | | | Desorbed fraction | | | |
|---|---|---|---|---|---|---|---|---|
| Run No. | Yield, weight percent | Percent MCP | Percent PCP plus A | Percent PCP plus A, percent MCP | Yield, weight percent | Percent MCP | Percent PCP plus A | Percent PCP plus A, percent MCP |
| 1 | 12.5 | 97.6 | 1.4 | 0.01 | 2.8 | 1.0 | 99.0 | 99.0 |
| 2 | 12.0 | 94.0 | 1.7 | 0.02 | | | | |
| 4 | 12.5 | 89.7 | 9.3 | 0.10 | | | | |
| 6 | 12.4 | 84.0 | 13.5 | 0.16 | | | | |
| 8 | 12.5 | 82.0 | 15.9 | 0.19 | | | | |
| 9 | | | | | 7.5 | 1.0 | 99.0 | 99.0 |
| 10 | 12.4 | 97.7 | 1.5 | 0.02 | 2.8 | 1.0 | 99.0 | 99.0 |

Note.—MCP=monochloroparaffins; PCP=polychloroparaffins; A=aromatics.

TABLE II

[Run number 1, charge: 20 grams/100 grams of silica gel]

| | Weight percent component | | | |
|---|---|---|---|---|
| | Paraffin fraction | Chloraparaffin fraction | Desorbed, pentene-1 | Total |
| Yield | 83.2 | 12.0 | 3.6 | 98.8 |
| P | 99.6 | 0.5 | | |
| MCP | 0.4 | 96.9 | ~1 | |
| PCP | | 1.0 | ~31 | |
| A | | 1.6 | 68 | |
| Total | 100.0 | 100.0 | 100 | |

[Run number 2, charge: 40 grams/100 grams of silica gel]

| | Weight percent component | | | |
|---|---|---|---|---|
| | Paraffin fraction | Chloraparaffin fraction | Desorbed, benzene | Total |
| Yield | 81.3 | 12.6 | 2.3 | 96.2 |
| P | 98.5 | 0.8 | | |
| MCP | 1.5 | 97.8 | ~1.0 | |
| PCP | | 0.3 | 65.7 | |
| A | | 1.1 | 33.3 | |
| Total | 100.0 | 100.0 | 100.0 | |

[Run number 3, charge 80 grams/100 grams of silica gel]

| | Weight percent component | | | | |
|---|---|---|---|---|---|
| | Paraffin fraction | Intermediate fraction | Chloroparaffin fraction | Desorbed | Total |
| Yield | 63.8 | 25.2 | 6.8 | 2.5 | 98.3 |
| P | 99.6 | 70.6 | 0.4 | | |
| MCP | 0.4 | 29.0 | 96.4 | ~1.0 | |
| PCP | | 0.4 | 2.8 | 63.0 | |
| A | | | 0.4 | 36.0 | |
| Total | 100.0 | 100.0 | 100.0 | 100.0 | |

Note.—P=paraffin; MCP=monochloroparaffin; PCP=polychloroparaffin; A=aromatics.

The above results indicate that substantially complete separation was effected at the 20 gram and 40 gram loading level but that a 25 percent recycle of intermediate fraction is required at the 80 gram loading level.

It will also be seen that the purity of the paraffins recovered and the monochloroparaffins recovered was exceedingly high.

It will be seen that as the concentration of polychloroparaffins and aromatics on the silica gel bed increases, larger amounts of these components are eluted or washed from the gel bed by n-pentane during the recovery of the monochloroparaffins. The concentration of polychloroparaffins and aromatics in the monochloroparaffin fraction increased from 1.7 to 15.9 percent in 7 cycles without benzene desorption. The ratio of polychloroparaffins plus aromatics to monochloroparaffins increased from 0.01:1 to 0.19:1 during this time.

After benzene desorption and pentane washing, the separation efficiency of the silica gel was restored and the polychloroparaffin plus aromatic content of the monochloroparaffin fraction was reduced to 1.5 percent.

The data also show that for efficient separation of monochloroparaffins from polychloroparaffins and aromatics only about 2 cycles can be made without benzene desorption when the total polychloroparaffin plus aromatic content of the charge is 3 percent or higher. If the concentration of these two components is less than about 3 percent or if a lower charge to adsorbent ratio is used a larger number of cycles can be made before it is necessary to desorb the silica gel.

EXAMPLE IV

A large scale run was carried out in a column 8 feet long by 2½ inches in diameter. The silica gel in the column amounting to 4 kilograms was the same as that employed in the previous examples, that is, a commercial adsorbent silica gel of 28–200 mesh. The charge consisted of 11 liters of a chlorinated paraffin product made by chlorinating straight chain $C_{10}$–$C_{13}$ paraffins. The charge contained 14.8 weight percent monochloroparaffins, 83.9 weight percent unconverted paraffin and 1.3 weight percent di- and polychloroparaffins. Four successive passes were made through the same silica gel bed and over one liter of 96.2 weight percent purity monochloroparaffin was recovered. There was 3.8 weight percent polychloroparaffins in the monochloroparaffin fraction since it was the object of these runs to separate paraffins from chlorinated paraffins only. Two solvents were employed, cyclohexane being used to elute the paraffins while pentene-1 was introduced to accelerate recovery of the paraffins from the silica gel bed. The charge sequence per cycle was as follows: (1) 2.5 liters of the paraffin-chloroparaffin mixture; (2) 2 liters of cyclohexane; (3) 1 liter of pentene-1 and (4) 2 liters of cyclohexane. At an adsorbent charge ratio of 2.1:1 the paraffin yield ranged from 75–80 weight percent of the charge while the recovered chloroparaffin represented 10.8–11.3 weight percent of the charge. The intermediate or recycle fraction ranged from 9–14 weight percent of the charge. Based on the yield data obtained in these runs, 2.28 gallons of saturated solvent and 0.57 gallon of olefin were required to separate 1 pound of monochloroparaffin from the paraffin-chloroparaffin charge.

As many possible embodiments can be made of this invention without departing from the broad scope thereof, it is to be understood that all matter herein set forth is to be interpreted as illustrative and not as unduly limiting the invention.

We claim:

1. A method for the separation of straight chain paraffins having from 8 to 18 carbon atoms in the molecule from chloroparaffins having from 8 to 18 carbon atoms in the molecule wherein small amounts of aromatic hydrocarbons are contained in said paraffin-chloroparaffin mixture and said chloroparaffins consist of a mixture of monochloroparaffins and polychloroparaffins, which comprises passing said mixture of said paraffins, chloroparaffins and aromatic hydrocarbons through a single bed of silica gel adsorbent, following said mixture with a saturated hydrocarbon solvent having from 5 to 8 carbon atoms in the molecule, separately collecting a solvent-paraffin fraction and a solvent-monochloroparaffin fraction, passing successive cycles of said paraffin-chloroparaffin aromatic hydrocarbon mixture followed by said saturated hydrocarbon solvent through said silica gel bed until said bed becomes saturated with said polychloroparaffins and said aromatic hydrocarbons, thereafter eluting said polychloroparaffins and aromatic hydrocarbons with a $C_5$–$C_8$ monoolefin or benzene or toluene from said bed, and following said elution step by passing said saturated hydrocarbon solvent through said bed to regenerate said bed for the next series of cycles.

2. The method according to claim 1 wherein the paraffins have from 10 to 13 carbon atoms and the chloroparaffins have from 10 to 13 carbon atoms.

3. The method according to claim 1 wherein the saturated hydrocarbon solvent is n-pentane.

4. The method according to claim 1 wherein the polychloroparaffins and aromatic hydrocarbons are eluted with pentene-1.

5. The method according to claim 1 wherein the polychloroparaffins and aromatic hydrocarbons are eluted with benzene.

6. The method according to claim 1 wherein said separately collected solvent-paraffin fractions and solvent-monochloroparaffin fractions are distilled to remove the solvent and recover the paraffins and monochloroparaffins respectively.

References Cited

UNITED STATES PATENTS

| | | | |
|---|---|---|---|
| 2,644,018 | 6/1953 | Harper | 260—674 |
| 3,419,627 | 12/1968 | Keeling et al. | 260—652 |
| 2,818,455 | 12/1957 | Ballard et al. | 260—676 |
| 2,597,910 | 5/1952 | Thaw et al. | 260—677Hal |
| 2,441,572 | 5/1948 | Hirschler et al. | 208—310 |

HERBERT LEVINE, Primary Examiner

U.S. Cl. X.R.

260—652, 676